INVENTOR.
Jerome C. Salmons
BY
Murray A. Gleeson
ATTORNEY

INVENTOR.
Jerome C. Salmons
BY
Murray A. Gleeson
ATTORNEY

United States Patent Office 2,851,260
Patented Sept. 9, 1958

2,851,260

CUTTER CHAIN SLACK TAKEUP MECHANISM FOR VARIABLE HEIGHT BORING TYPE MINER

Jerome C. Salmons, Chicago, Ill., assignor to Goodman Manufacturing Company, Chicago, Ill., a corporation of Illinois Application January 20, 1955, Serial No. 482,928

11 Claims. (Cl. 262—7)

This invention relates generally to mining machines of the boring type and more particularly to mechanism for taking up the slack of the cutter chain of the boring head of a continuous miner whereby operation is possible in seams of varying thickness.

One of the problems attendant upon the use of a boring type miner is that of accommodating seams of varying thickness. Ordinarily, it is not difficult to vary the diameter of the boring arms to accommodate such variation in seam thickness, but the position of the lower and upper cutter chain guides must also be varied to cut the upstanding and depending cusps remaining from the action of the boring arms. The endless cutter chain travelling upon such guide, which cutter chain has a fixed length, must have its slack maintained substantially constant for all positions of the upper and lower cutter chain guides. It is to the problem of maintaining the slack substantially constant that this invention is directed.

According to the present invention one of the cutter chain guides, preferably the upper, supports an idler for the cutter chain, which idler engages a bight of the chain, the length of such bight varying in accordance with the position of the guide so that the chain traverses a closed path of substantially uniform slack at all times. Such idler is mounted upon a linkage mechanism adjusted in position in accordance with the position of one of the chain guides so that the linkage and idler position is adjusted nicely at all times to maintain such desired amount of slack.

It is a principal object of this invention to provide a takeup mechanism for the endless cutter chain of a boring type miner whereby the slack of the chain will be substantially constant at all times irrespective of the distance between the cutter chain guides.

Other objects and important features of the invention will be apparent from a study of the specification following taken with the drawings which together show and describe a number of preferred embodiments of the invention and what are now considered to be the best modes of practicing the principles thereof. Other embodiments of the invention may be suggested to those having the benefit of the teachings herein, and it is therefore intended that the scope of the invention not be limited by the precise embodiments herein shown, such other embodiments being intended to be reserved especially as they fall within the scope and breadth of the subjoined claims.

Figure 2:
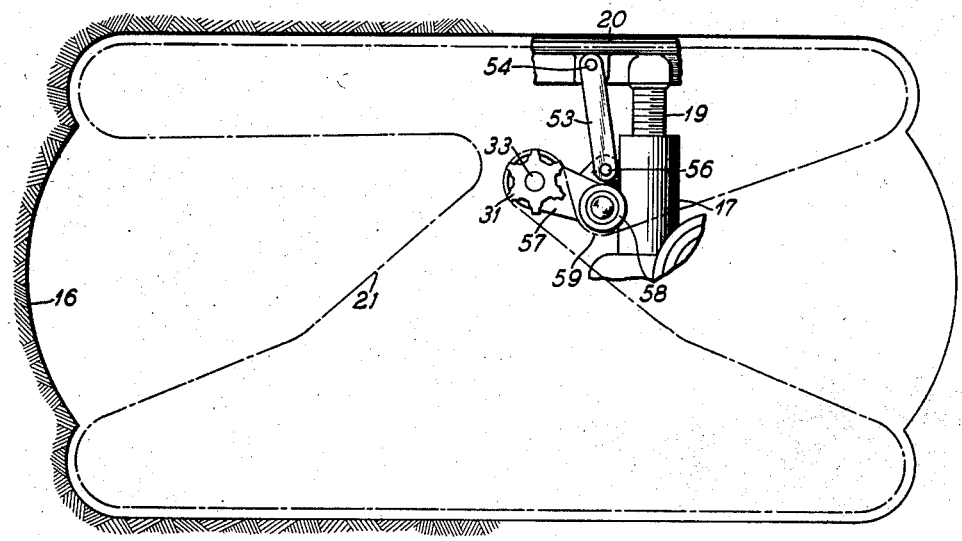
Fig. 2 shows schematically the upper and lower cutter chain guides and the path of travel of the endless cutter chain guided thereby when the miner shown in Fig. 1 is operating in a seam of one thickness, and showing the position of the slack takeup device according to the present invention in such operating position of the miner.
Figure 3:
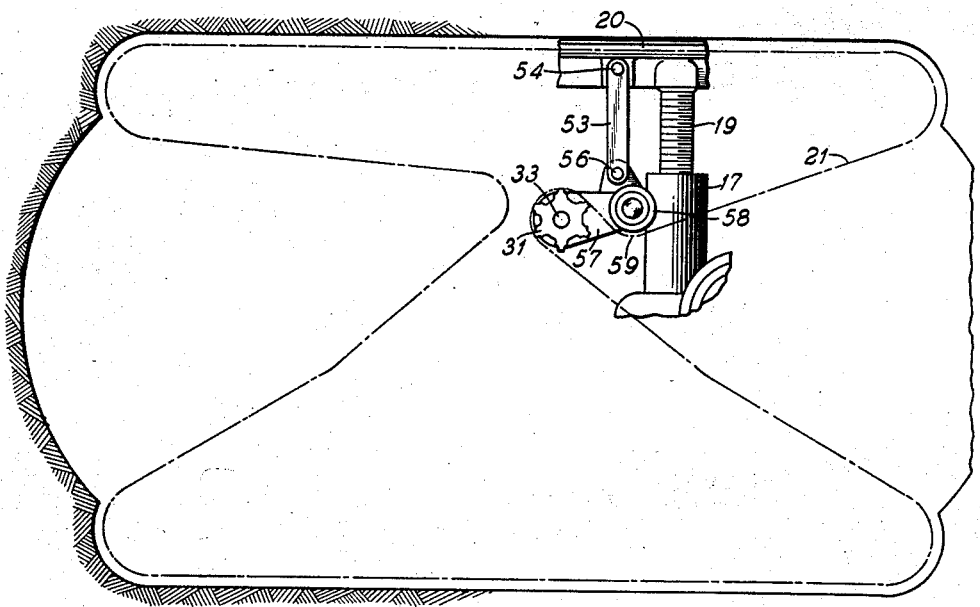
Fig. 3 is a view similar to Fig. 2 but showing the miner operating in a seam of greater thickness, and showing the position taken by the slack takeup mechanism in providing substantially constant slack for the chain in such position of the upper and lower cutter chain guides.
Figure 4:
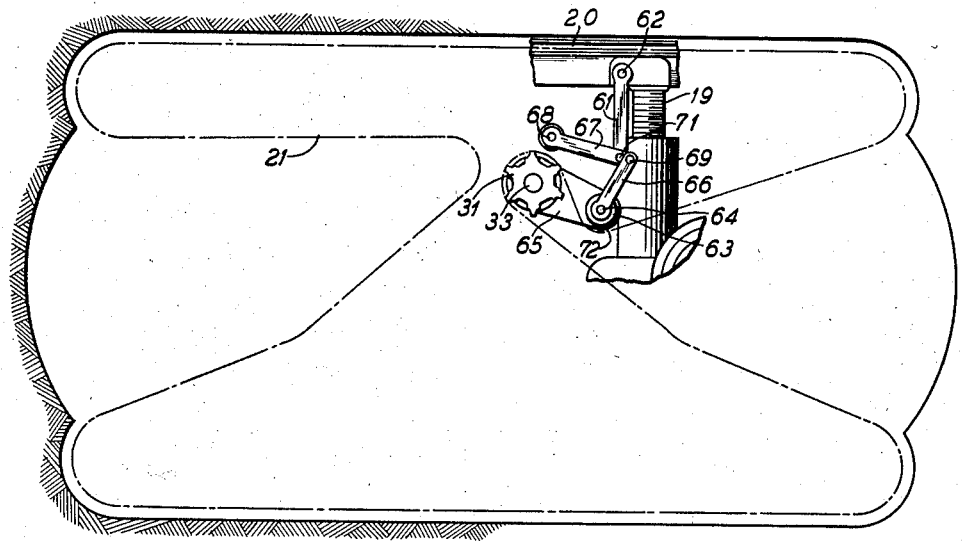
Figure 5:
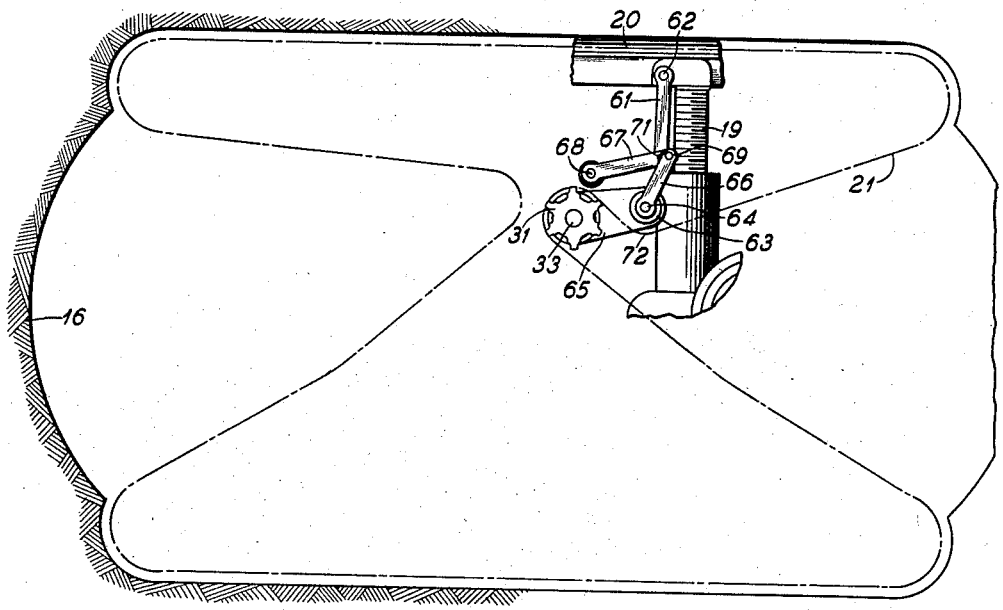

Fig. 4 is a view similar to Fig. 2, but showing another form of slack takeup mechanism, whereby the amount of slack of the cutter chain may be held within closer limits than that possible with the embodiment shown in Figs. 2 and 3; and Fig. 5 is a view similar to Fig. 4 and showing the position of the slack takeup mechanism according to this second embodiment when the cutter chain guides are in an extended position, and in which position the amount of slack of the cutter chain is held to substantially the same amount as that prevailing when the cutter chain guides are in the position seen in Fig. 4.

Figure 1:
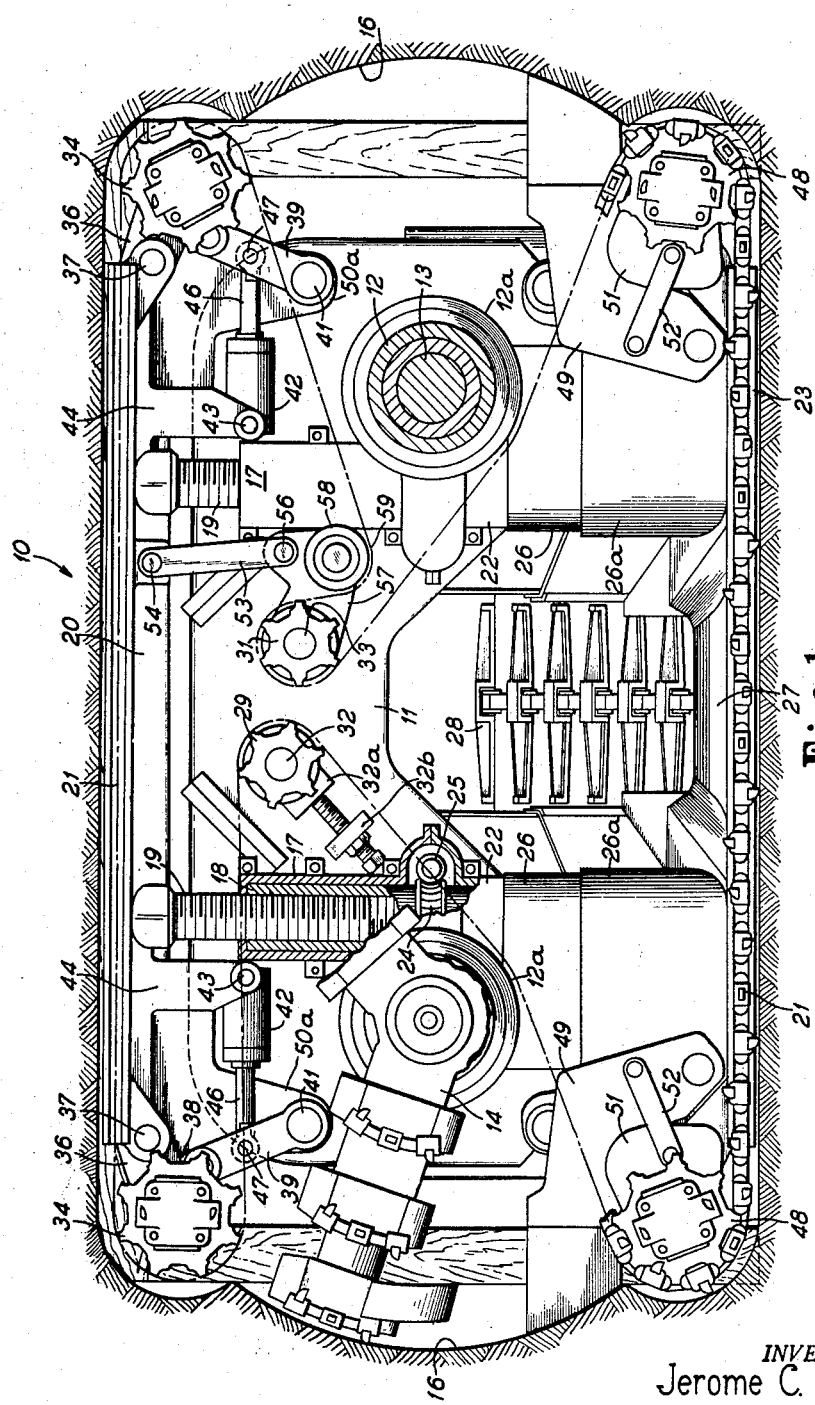
Fig. 1 is a front elevation view of the boring head of a continuous miner of the boring arm type, said miner having embodied therein a cutter chain slack takeup mechanism according to the present invention.

Referring now to the drawings, there is shown the boring head of a continuous miner of the general type as is disclosed in an application of Jerome C. Salmons, Serial No. 408,003, filed February 3, 1954, now Patent No. 2,719,709, for Improvements in Mining Machines. The boring head shown in Fig. 1 is referred to generally by the reference numeral 10, and includes a gear or drive housing 11 having extending therefrom hollow bosses 12 with base flanges 12a. The hollow bosses 12 enclose shafts 13 extending from the drive housing 11 and supporting boring arms 14. The two boring arms 14 are constructed, with means not shown, whereby the effective cutting diameter of each may be varied to accommodate seams of different thickness and variations in such seam.

The action of the boring arms 14 is such as to leave behind upper and lower cusps, not shown. In order to remove these remaining cusps the endless cutter chain is arranged to move upon upper and lower guides having idler sprockets mounted on each end thereof, so that in addition to cutting the cusps the cutter chains cut a substantially rectangular bore in the seam 16 as seen in Fig. 1.

To this end the gear housing 11 has mounted on the forward wall thereof a pair of spaced supports 17 which house an internally threaded sleeve 18, such sleeve being in threaded engagement with a threaded post 19 which has fastened at its upper end an upper chain guide 20.

A lower chain guide 23 is mounted for similar movement as the upper chain guide 20 and is supported upon a similar threaded post, not shown, housed within a hollow support 22 also mounted upon the forward wall of the gear housing 11. The threaded sleeve 18, which has threads of opposite hand at the upper and lower ends thereof, is formed with a worm wheel 24 to be rotated by a worm 25, driven from a fluid motor, not shown. Upon rotation of the worm 25 the upper chain guide 20 and the lower chain guide 23 may be moved in a vertical plane towards and away from each other.

The lower support 22 for the lower chain guide 23 is provided with a fixed deflector plate 26, which is also secured to the forward wall of the gear housing 11. A deflector plate 26a is movable with the lower chain guide 23 and in telescoping relationship with the fixed deflector plate 26. The action of the deflector plates 26 and 26a is such as to deflect cuttings into a throat 27 therebetween, cuttings between carried from the throat 27 by means of an endless flight conveyor 28.

An endless cutter chain 21 is arranged to be guided by the upper cutter chain guide 20 and by the lower chain guide 23, and is arranged to be driven by a sprocket 31 mounted fast upon a shaft 33 extending from the drive housing 11 and turned by suitable mechanism therein and not shown.

The endless cutter chain 21 is arranged to be initially adjusted in its slack by means of an idler sprocket 29 turning freely upon a stub shaft 32 extending from a support 32a which is adjusted in its position by means of an adjusting assembly 32b as shown.

The upper chain guide 20 has an idler sprocket 34 mounted at each end thereof, and each of said sprockets is supported on an arm 36 arranged to pivot with respect to the upper chain guide 20 about a pin connection 37. The arm 36 is pivotally connected substantially midway of the length thereof to a link 38 in turn pivotally connected to a link 39 hingedly anchored at 41 to a depending arm 50a carried by the upper guide 20. An actuating cylinder 42 for the sprocket 34 is pivotally connected at 43 to downward extending brackets 44 from the upper chain guide 20. The cylinder 42 has a piston rod 46 pivotally connected at 47 to the link 39, and so arranged that when the piston rod 46 is withdrawn into the cylinder 42 the sprockets 34 will be rocked to a collapsed position.

The lower cutter chain guide 23 has similarly mounted at each end thereof an idler sprocket 48 which is arranged to pivot with respect thereto as disclosed more clearly in a co-pending application of Charles T. Ogden, Serial No. 447,860, filed August 4, 1954, now Patent No. 2,719,710 for Improvements in Pusher Plate Operating Mechanism for Continuous Miners. Said application is directed to the construction of a pusher plate 49, an auxiliary pusher plate 51, and an actuating link 52 associated therewith.

As seen in Fig. 1, the cutter chain is trained about the idler sprockets 34, 34, the idler sprocket 29 and the lower idler sprockets 48, 48, being guided along the upper and lower runs by the upper and lower chain guide 20 and 23 respectively. The cutter chain is additionally guided along the underside of the base flanges 12a of the hubs 12, the endless cutter chain 21 being driven by the drive sprocket 31.

Means are provided for engaging the chain in a bight, the effective length of which is changed in accordance with the position of the upper and lower chain guides 20 and 23. To this end there is provided a link 53 which is hingedly connected at 54 to the upper chain guide 20, the lower end of the link 53 being pivotally connected at 56 to an arm 57 which turns about the turning center of the shaft 33. The arm 57 supports an idler roller 58, to engage a bight 59 of the chain 21.

As seen in Fig. 3 of the drawings the bight 59 of the chain 21 becomes shortened as the upper cutter bar 20 and the lower cutter bar 23 are moved apart. Such change in effective length of the bight 59 maintains the slack in the chain 21 constant throughout all useful ranges of operation.

Referring now to Figs. 4 and 5 of the drawings, there is shown another embodiment of the invention where the slack of the cutter chain 21 may be maintained substantially constant within closer limits than that capable of the mechanism as seen in Figs. 1, 2 and 3 of the drawings.

To this end there is provided a link 61 which is hingedly connected at 62 at its upper end to the upper cutter chain guide 20. The lower end of the link 61 is pivotally connected to a linkage assembly consisting of an arm 65 having its turning center coincident with the shaft 33 upon which the sprocket 31 is supported. The arm 65 has an idler shoe 63 mounted at the free end thereof, the center of turning of the idler shoe being coincident with a pivotal connection 64 with a link 66. A link 67 is pivotally connected at 68 to the front wall of the gear housing 11, and has the other end thereof pivotally connected at 69 to the link 66 connected to the arm 65.

The assembly just described is hingedly connected to the link 61 at a pivotal connection 71 at a point between the pivotal connections 68 and 69 but closely adjacent to the pivotal connection 69.

As seen in Fig. 4, the linkage assembly adopts the position shown when the upper and lower cutter chain guides are at a minimum working distance. As seen in Fig. 5, the linkage mechanism described adopts the position shown when the upper and lower chain guides are in their extended position of operation in a seam of greater thickness.

In each case the idler shoe 63 engages a bight 72 of the chain, which bight is shortened in accordance with the amount of extension of the lower and upper cutter chain guides, the bight 72 shortening so as to maintain substantially a uniform amount of slack in the cutter chain at all times.

From the foregoing description it is believed evident that there has been provided a novel construction for maintaining a uniform amount of slack in the cutter chain of a boring type miner at all times. Such mechanism is effective to maintain a substantially uniform amount of slack throughout the entire effective range of positions of the lower and upper cutter chain guides.

While the invention has been described in terms of some preferred embodiments thereof, it is to be understood that the scope of the invention is intended to be limited only by the claims here appended.

I claim as my invention:

1. In a mining machine of the type having a frame structure a pair of boring arms arranged to cut contiguous bores in a seam of coal or the like, upper and lower guides for an endless cutter chain arranged to cut cusps remaining from the action of said boring arms, means for raising and lowering at least one of said guides relative to the frame structure, means for driving said cutter chain and moving same in a path including said lower and upper guides, a bight in said chain, and means for varying the length of said bight in accordance with the relative position of said guides in order to maintain substantially uniform slack on said chain at all times, said means including a shoe for changing the direction of said chain at said bight, a support pivoted to said frame structure and movably supporting said shoe, and a linkage hingedly connected to both the said one of said guides and the support for said shoe to effectively control the movement of said shoe in the same general direction as the movement of the said one of said guides during said raising and lowering thereof in order to maintain the slack in the chain substantially uniform over the range of movement of the said one of said guides.

2. In a mining machine having a frame structure, a pair of boring arms arranged to cut contiguous bores, upper and lower guide means for an endless cutter chain arranged to cut cusps remaining from the action of said boring arms, means for raising and lowering said guide means relative to the frame structure, a bight in said chain, means for varying the length of said bight in accordance with the relative position of one of said guide means in order to maintain substantially uniform slack on said chain at all times, said means including a shoe changing the direction of said chain at said bight, a support means pivotally connected to said frame structure and movably supporting said shoe, and a linkage assembly having one portion thereof pivotally connected to the said one guide means and a second portion thereof pivotally connected to said support means to effect the movement of the shoe concurrent with the raising and lowering of the said one guide means and control the movement of the shoe to maintain the slack in the chain substantially uniform over the range of movement of the said one guide means.

3. The structure as set forth in claim 2 wherein said one portion of the linkage assembly includes a first link pivotally connected to the said one guide means and said second portion of the linkage assembly includes an arm pivotally connected to the first link and pivotally connected to the frame structure in spaced relation to said support means and a second link pivotally connected to both the support means and the arm.

4. In a mining machine having a frame structure, a pair of boring arms arranged to cut contiguous bores, upper and lower guide means for an endless cutter chain arranged to cut cusps remaining from the action of said boring arms, means for moving at least one of said guide means relative to the frame structure, a bight in said chain, means for varying the length of said bight in accordance with the relative position of the movable guide means in order to maintain substantially uniform slack on said chain at all times, said means including a shoe changing the direction of said chain at said bight, a support means pivotally connected to said frame structure and movably supporting said shoe for arcuate swinging movement thereof, and a linkage assembly having a link pivotally connected to both the movable guide means and the support means and effective to cause the arcuate swinging movement of the shoe to be concurrent with the movement of the movable guide means in order to maintain the slack in the chain substantially uniform throughout the range of movement of the movable guide means.

5. In a mining machine having a frame structure, a pair of boring arms arranged to cut contiguous bores, upper and lower guide means for an endless cutter chain having a fixed length and arranged to cut cusps remaining from the action of said boring arms, means for raising and lowering said guide means relative to the frame structure, a bight in said chain, means for varying the length of said bight in accordance with the relative position of the guide means in order to maintain substantially uniform slack on said chain at all times, said means including a shoe changing the direction of said chain at said bight, a supporting arm pivotally connected to said frame structure and movably supporting said shoe for movement relative to said guide means, and a linkage assembly pivotally connected to one of the guide means and also pivotally connected to the supporting arm to effect and control the movement of said shoe in the same general direction and concurrent with the raising and lowering of the said one guide means, so that the slack in the chain is maintained substantially uniform during the raising and lowering of the said guide means.

6. The structure as set forth in claim 5 wherein said linkage assembly includes a first link pivotally connected to said frame structure in spaced relation to said supporting arm, a second link pivotally connected to both the supporting arm and said first link and a third link pivotally connected to the one of said guide means and pivotally connected to the said first link.

7. In a mining machine of the type having a pair of boring arms arranged to cut contiguous bores, a guide means for an endless cutter chain arranged to cut a cusp remaining from the action of said boring arms, means for raising and lowering said guide means, a bight in said chain, means for varying the length of said bight in accordance with the relative position of the guide means in order to maintain substantially uniform slack on said chain at all times, said means including a shoe changing the direction of said chain at said bight, a support means pivotally connected to said machine and movably supporting said shoe for movement relative to said guide means, and a linkage assembly having one portion thereof pivotally connected to the guide means and a second portion thereof pivotally connected to said support means to effect and control the movement of the shoe so that the slack in the chain is maintained substantially uniform during the raising and lowering of the guide means.

8. The structure as set forth in claim 7 wherein said one portion of the linkage assembly includes a first link pivotally connected to the said one guide means and said second portion of the linkage assembly includes an arm pivotally connected to the first link and pivotally connected to the machine in spaced relation to said support means and a second link pivotally connected to both the support means and the arm.

9. In a mining machine having a frame structure, a pair of boring arms arranged to cut contiguous bores, a guide means for an endless cutter chain arranged to cut a cusp remaining from the action of said boring arms, means for raising and lowering said guide means relative to the frame structure, a bight in said chain, means for varying the length of said bight in accordance with the relative position of the guide means in order to maintain substantially uniform slack on said chain at all times, said means including a shoe changing the direction of said chain at said bight, a support means pivotally connected to said frame structure and movably supporting said shoe for arcuate swinging movement thereof, and a linkage assembly having a link pivotally connected to the guide means and the support means and effective to cause the arcuate swinging movement of the shoe to be concurrent with and in the same general direction as the movement of the guide means during said raising and lowering thereof in order to maintain the slack in the chain substantially uniform.

10. In a mining machine having a frame structure, a pair of boring arms arranged to cut contiguous bores, a guide means for an endless cutter chain having a fixed length and arranged to cut a cusp remaining from the action of said boring arms, means for raising and lowering said guide means relative to the frame structure, a bight in said chain, means for varying the length of said bight in accordance with the relative position of the guide means in order to maintain substantially uniform slack on said chain at all times, said means including a shoe changing the direction of said chain at said bight, a supporting arm pivotally connected to said frame structure and movably supporting said shoe to effectively vary the length of said bight, and a linkage assembly pivotally connected to the guide means and also pivotally connected to the supporting arm to effectively control the movement of the shoe concurrent with and in the same general direction as the raising and lowering of the guide means.

11. The structure as set forth in claim 10 wherein said linkage assembly includes a first link pivotally connected to said frame structure in spaced relation to said supporting arm, a second link pivotally connected to both the supporting arm and said first link and a third link pivotally connected to the one of said guide means and pivotally connected to the said first link.

References Cited in the file of this patent

UNITED STATES PATENTS

| Re. 21,388 | DeVry | Mar. 12, 1940 |
| 96,718 | Meriam | Nov. 9, 1869 |
| 2,705,625 | Robbins | Apr. 5, 1955 |
| 2,743,093 | Robbins | Apr. 24, 1956 |
| 2,753,169 | Joy | July 3, 1956 |